(12) United States Patent
Belton et al.

(10) Patent No.: US 8,973,083 B2
(45) Date of Patent: Mar. 3, 2015

(54) PHANTOM GAMING IN BROADCAST MEDIA SYSTEM AND METHOD

(76) Inventors: Thomas A. Belton, Princeton, NJ (US); David J. Braun, Newtown, PA (US)

( * ) Notice: Subject to any disclaimer, the term of this patent is extended or adjusted under 35 U.S.C. 154(b) by 319 days.

(21) Appl. No.: 11/745,251

(22) Filed: May 7, 2007

(65) Prior Publication Data

US 2008/0005775 A1    Jan. 3, 2008

Related U.S. Application Data

(60) Provisional application No. 60/746,510, filed on May 5, 2006.

(51) Int. Cl.
*H04N 7/16* (2011.01)
*A63F 13/30* (2014.01)
*H04N 7/173* (2011.01)
*H04N 21/478* (2011.01)

(52) U.S. Cl.
CPC ............ *A63F 13/12* (2013.01); *H04N 7/17318* (2013.01); *H04N 21/4781* (2013.01); *A63F 2300/409* (2013.01); *A63F 2300/69* (2013.01)
USPC ........... 725/139; 725/100; 725/109; 725/110; 725/115; 725/131; 725/133; 725/134; 725/141; 463/1; 463/40; 463/42; 463/43

(58) Field of Classification Search
USPC ................. 725/139, 100, 109–110, 115, 131, 725/133–134, 141; 463/1.3, 1, 40, 42–43
See application file for complete search history.

(56) References Cited

U.S. PATENT DOCUMENTS

| | | | |
|---|---|---|---|
| 5,264,933 A | 11/1993 | Rosser et al. | |
| 6,349,410 B1 * | 2/2002 | Lortz | 725/110 |
| 2004/0259631 A1 * | 12/2004 | Katz et al. | 463/25 |
| 2005/0130725 A1 * | 6/2005 | Creamer et al. | 463/1 |

* cited by examiner

*Primary Examiner* — Mulugeta Mengesha
(74) *Attorney, Agent, or Firm* — Roy Rosser

(57) ABSTRACT

This invention provides a system and method of integrating video games into live sporting events, or the converse, in an interactive way. In a preferred embodiment of the invention, a viewer watching a broadcast sporting event can elect to become a "phantom participant" in an event. At one or more designated points in the event (e.g., a golf tournament), the viewer's set-top box will switch from feeding the broadcast event to the viewer's television screen to feeding a stream from a video game unit to the same television screen. The video game unit is configured to receive information from the broadcast feed that includes information such as, but not limited to, the event location, the hole being played (in the golf example), the participants, and statistics related to the performance of the participants. This information may be used by the video game unit to present the viewer with the opportunity to "virtually" compete with the participants in the broadcast event.

5 Claims, 3 Drawing Sheets

PHANTOM GAMING IN BROADCAST MEDIA SYSTEM AND METHOD

CROSS REFERENCE TO RELATED APPLICATIONS

This application is based on and claims priority to U.S. Provisional Application No. 60/746,510, filed May 5, 2006, and is related to International Application No. PCT/06/008974, filed on Mar. 10, 2006 by David J. Braun and Thomas A. Belton, entitled "System and Method of Staging a Golf Tournament," and International Application No. PCT/US06/008648, filed on Mar. 10, 2006 by David J. Braun and Thomas A. Belton, entitled "System and Method for Influencing an On-going" Event", the contents of which are hereby incorporated by reference.

FIELD OF THE INVENTION

The present invention relates to systems and methods of broadcasting sporting events and video games and particularly to systems and methods for integrating video games into broadcast sporting events or, alternatively, for integrating broadcast sporting events into video games.

BACKGROUND OF THE INVENTION

Video gaming is a tremendously lucrative and competitive industry around the world. Video-game designers are constantly trying to develop new games, new gaming systems, and new gaming concepts. The Ninentdo Wii is but one example of a new video-gaming concept that has been successfully introduced and it is changing the way in which video games are used and developed.

A major reason for the success of video gaming is the ability and tendency of humans to fantasize. It can begin very early in childhood, as young children play with dolls or action figures. As they get older and begin playing sports, children playing backyard wiffleball fantasize about coming to bat with the bases loaded in the ninth inning of game 7 of the World Series, or imagine themselves walking up the 18th fairway at Augusta as they play a round of golf or even miniature golf at a local venue. Video games bring this penchant for fantasy to a new level, allowing gamers to select teams based on actual sports players and then play the games by controlling the "virtual players" to make them perform on the virtual playing field.

While present video games allow the game player to mimic the look and feel of participating in a sporting event, the virtual competitors that they are playing against are computer-generated and the performances of their virtual competitors are computer-generated as well. Unlike reality, in the video game, a virtual Tiger Woods never has a bad round, and there is no connection between the performance of the virtual Tiger Woods and the performance of the actual Tiger Woods on any given day in any given event. To simulate a sporting event in a video game in a more realistic manner, it would be desirable to have a video game system and method whereby a video game player could play against competitors based on the performance of the competitors in an actual event, and preferable one that is occurring essentially simultaneously with the game play.

SUMMARY OF THE INVENTION

Briefly described, the invention provides a system and method of integrating video games into live sporting events, or the converse, in an interactive way.

In a preferred embodiment of the invention, a viewer watching a broadcast sporting event can elect to become a "phantom participant" in an event. At one or more designated points in the event (e.g., a golf tournament), the viewer's set-top box will switch from feeding the broadcast event to the viewer's television screen to feeding a stream from a video game unit to the same television screen. The video game unit is configured to receive information from the broadcast feed that includes information such as, but not limited to, the event location, the hole being played (in the golf example), the participants, and statistics related to the performance of the participants. This information may be used by the video game unit to present the viewer with the opportunity to "virtually" compete with the participants in the broadcast event. While the viewer is taking his turn in the game, the actual game may be recorded in a digital video recorder (DVR) connected to the set-top box. In this way the set-top box may, after the viewer has had his or her turn, switch back to providing a view of the game from where it was interrupted so that it appears to the viewer that he/she is playing along with the actual event-participants.

In a further preferred embodiment of the invention, the DVR may record the game while it is being broadcast. When the viewer elects to take his/her turn, in addition to continuing to record the broadcast, the DVR may feed selected footage to a live video insertion unit capable of seamlessly merging images from the game unit with the recorded broadcast material. In this way the game unit may generate images of the viewer taking his/her turn which are inserted into the broadcast footage so that the computer generated output of the video game is made to look as if the viewers' participation is part of the broadcast. If the game unit has been preloaded with actual images of the viewer, the merged output may appear to be the viewer participating in the broadcast event.

In a further preferred embodiment of the invention, video from the broadcast sporting event can be streamed directly to a video game device with the output merged as described above.

These and other features of the invention will be more fully understood by references to the following drawings.

DETAILED DESCRIPTION

The present invention applies to systems and methods for merging video games with broadcast events, including live broadcast events.

Figure 1:
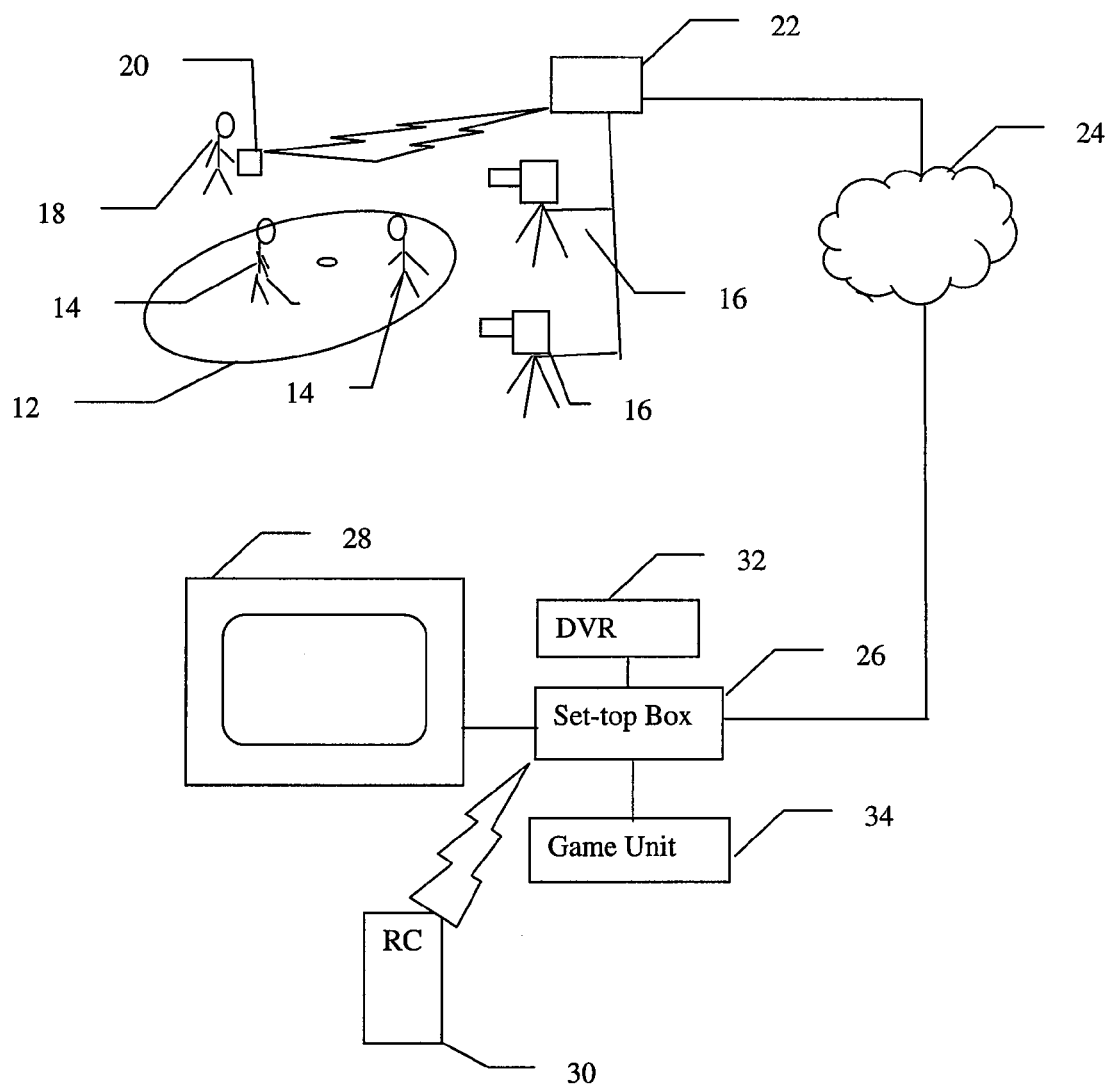
FIG. 1 is schematic drawing showing a video game being interstitially incorporated into a live broadcast of a golf game.

FIG. 1 is schematic drawing showing a video game being interstitially incorporated into a live broadcast of a golf game. Although a golf game is used for the purposes of illustrating the concepts of the invention, one of ordinary skill in the art will appreciate that the inventive concepts could readily be adapted to apply to most video games, including, but not limited to, football, soccer, basketball, baseball, hockey, horse racing, motor racing and tennis.

In FIG. 1, a number of players 14 are participating in a golf event on a golf course 12. The event is being televised for broadcast by one or more television cameras 16. In addition, auxiliary personnel, such as caddie 18, may be carrying additional statistics recording equipment, such as GPS (global positioning system) device 20. The GPS device 20 feeds back the approximate coordinates at which the ball lands after each player's 14 shot. For example, the caddie carrying the GPS device could stand over the ball and press a button identifying the ball with a particular player. These coordinates are fed back to a broadcast unit 22, such as a broadcast truck, to be incorporated into the video feed for broadcast to an end user's set-top box 26 over a wireless (e.g., standard broadcast; satellite) or wired (e.g., cable) connection 24. Other statistical information that may be incorporated into the video feed can include, but is not limited to, the course location, the competitors in the contest, the performance history of each of the competitors in the contest including the location of each of the competitors' balls after each shot, and the weather conditions including lighting and sky conditions.

The set-top box 26 feeds the video and audio portions of the broadcast through to an end user's television set 28 or other video display so that the end user may watch the broadcast event in the usual way. The additional statistics are fed by the set-top box 26 to a game unit 34 operatively coupled to the set-top box 26. The game unit 34 may, for instance, be a well know gaming unit such as a Microsoft Xbox, a Sony Game boy, a Nintendo Wii, or some other suitably adapted game device capable of generating graphics for video gaming.

At a predetermined point in the broadcast contest, such as after or before a particular contestant's turn, the user may be offered a turn to compete. Alternatively, the user could manually select a point themselves by, for example, pressing a button on a game controller or remote control device. At that time, the broadcast video and audio begins recording, via a digital video recorder 32, the broadcast event, and the set-top box 26 switches to feeding the output of the game unit 34 to the television set 28 instead of feeding the live broadcast to the television set. The game unit 34 may make use of the statistics about the broadcast event obtained via the set-top box 26 to generate a game segment set at the same location on the same course in the broadcast event. For instance, the game segment generated may be a three-dimensional rendition of the same location on the golf course as the actual contestants are currently located, with the contestants situated in their approximate positions. Using the remote control 30 or other suitable video game control unit, the user then takes his/her turn in the contest. This may be done in any of the usual way video game contests participate in simulated sports games such as, but not limited to, using arrow keys to take aim and a swing-timing graphic and a button to determine the strength or length of a shot. The end user's shot is then recorded and compared to the actual contests shots on the actual course. A scoreboard may also, for instance, be generated by the game unit 34 to display a score board with the end user scored relative to the other contestants in the actual game.

After the end user has taken their turn in the contest, the set-top box 26 then resumes display of the actual broadcast that was recorded by the digital video recorder 32, beginning from the point at which the actual broadcast was interrupted to allow the end user to play their ball.

Using the above described process, a user can not only view a broadcast of a sporting event, but actually feel as though they are actually participating in the event with the other players.

Figure 2:
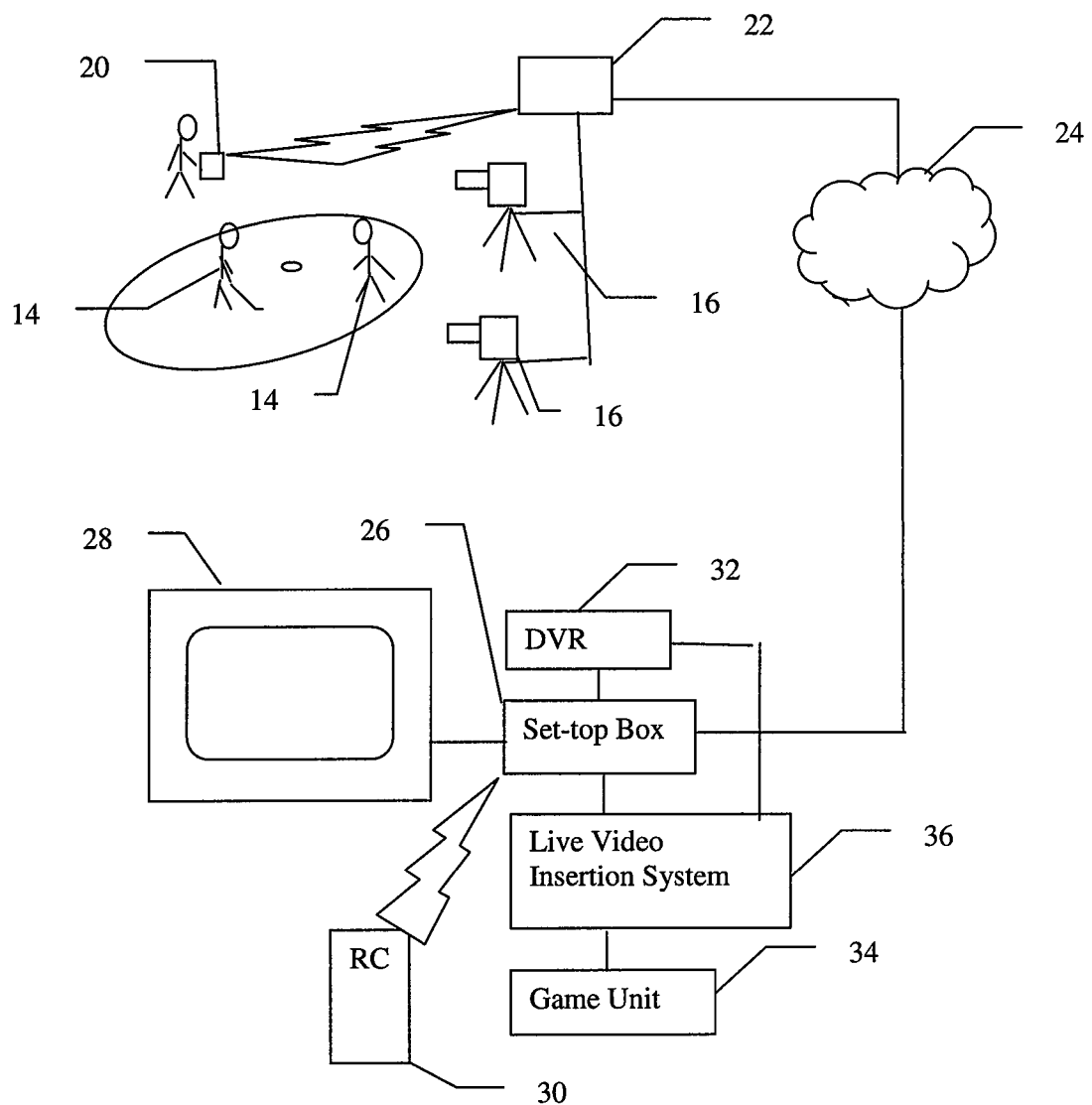
FIG. 2 is a schematic drawing showing a video game being merged with pre-recorded broadcast footage.

FIG. 2 is a schematic drawing showing a video game being merged with live and recorded video footage. In this embodiment of the invention, the event may be captured for broadcast in the same way as before. When it is time for the end user's turn, the set-top box 26 switches to displaying a video feed from a live video insertion system 36 instead of from the live feed of the broadcast event. The live video insertion system 36 is a device such as described in detail in, for instance, U.S. Pat. No. 5,264,933 issued to Rosser et al. on Nov. 23, 1993 entitled "Television displays having selected inserted indicia", the contents of which are hereby incorporated by reference. The live video insertion system 36 is a software or hardware device, or a combination thereof, that allows one or more images generated by the game unit 34 to be seamlessly and realistically combined with broadcast video or with pre-recorded video images sourced from the digital video recorder 32. The live video insertion system 36 merges images of the end user taking their turn in the contest with prerecorded footage of the golf course (in the golf course example) stored in the digital video recorder 32. In this way the end user will appear to be competing as part of the broadcast video. At the same time the digital video recorder 32 will be recording the broadcast contest so that at the end of the end user's turn, the event broadcast can continue to be shown from where it left off.

Figure 3:
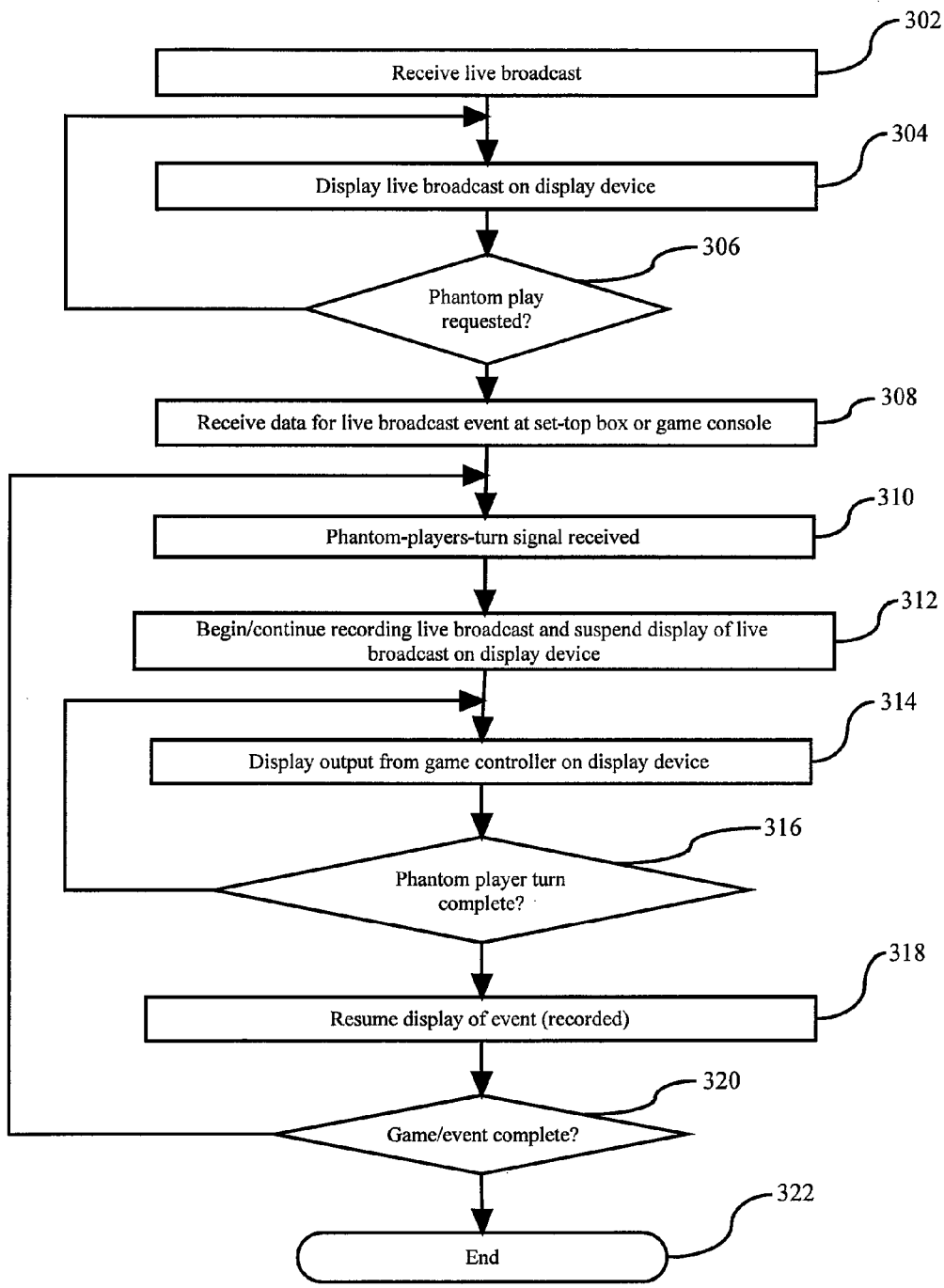
FIG. 3 is a flowchart illustrating the basic operation of the present invention.

FIG. 3 is a flowchart illustrating the basic operation of the present invention. At step 302, a user receives the live broadcast of an event that he or she intends to join as a phantom player. This involves the normal activity of turning on a television set or the display device and selecting the appropriate channel using, for example, a set-top box.

At step 304, the live broadcast is displayed on the display device. At step 306, a determination is made as to whether or not a phantom play signal has been received. If no phantom play has been requested at step 306, the process continues back to step 304 where the live broadcast is displayed as per normal. However, if at step 306, a phantom play has been requested, then at step 308, the set-top box or game console begins receiving and logging data from the live broadcast event which will be used during the phantom play. For example, the data pertaining to the scores of the various players participating in the live event, the location of the live event, the location of each player on the playing area of the live event (e.g., at which hole each player is located, etc.) and all other similar data.

At step 310, a phantom-player's-turn signal is received. This is simply a signal indicating that the phantom player may now begin gameplay using the game device. As mentioned above, this can be predetermined by the program to occur at a particular time (e.g., after the fourth player in a golfing foursome has taken their shot) or it can be triggered by a signal from the game player who presses a button on their game console, remote control, etc. The phantom-player's-turn signal causes the recording of the live broadcast to begin (or continue if recording has already begun) and the display of the live broadcast on the display device is suspended. At step 314, the output from the game controller is now displayed on the display device and the user begins play of their game as a phantom player participating in the in-progress event. At step 316, a determination is made as to whether or not the player's turn is complete. This can be, for example, upon the completion of a stroke in the case of a golf match. If the player's turn is not complete, the process proceeds back to step 314 and continues to display output from the game controller. If play is complete, then the display of the event continues on the display device at step 318. At step 320, a determination is made as to whether or not the entire game/event is completed. If it is not completed, the process proceeds back to step 310 where the phantom-player's-turn signal is awaited. If, however, at step 320 it is determined that the game/event is complete, then the process ends at step 322.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Modifications may readily be devised by those ordinarily skilled in the art without departing from the spirit or scope of the present invention.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A method of enabling simulated spectator participation an end user in a broadcast sporting event, comprising:
   receiving by an end user's set top box a broadcast of a sporting event comprising one or more actual players competing in the sporting event;
   displaying by said end user's set top box, the broadcast sporting event on a display device;
   receiving by said end user's set top box location and lighting information regarding one or more elements of said sporting event being broadcast;
   relaying by said end user's set top box said location and lighting information to a game unit functionally attached to said set top box and said display unit, whereby said game unit generates a video graphic game segment corresponding to a current location being shown on said broadcast sporting event;
   switching at a designated point in said broadcast of said sporting event, to recording said broadcast event on a video recording device and displaying said video graphic game segment on said display device on which said broadcast sporting event was being displayed;
   enabling said end user to appear and function as a participant on said displayed video graphic game segment being shown on said display device ;
   switching, on completion of said game segment participation, to displaying said recording of said broadcast sporting event on said display device on which said video game segment was being displayed.

2. The method of claim 1 wherein said visual representation of the actions of the viewer on a gaming device includes prerecorded video images generated by the gaming device so as to realistically combine the visual representations with the broadcast sporting event.

3. A system of enabling simulated video-spectator participation in a broadcast sporting event, comprising:
   a set-top box for receiving a broadcast of a sporting event comprising one or more actual players competing in the sporting event;
   a display device, functionally connected to said set-top box, for displaying the broadcast sporting event;
   a game unit functionally attached to said set top box and said display unit, for receiving location and lighting information regarding one or more elements of said sporting event being broadcast via said set-top box, and generating a video graphic game segment corresponding to a current location being shown on said broadcast sporting event;
   a switching element functionally connected to said set-top box, said game unit and said display unit, for, at a designated point in said broadcast of said sporting event, switching to recording said broadcast event on a video recording device and displaying said video graphic game segment on said display device that was displaying said broadcast;
   said gaming device enabling said end user to appear and function as a participant on said displayed video graphic game segment while it is being shown on said display device;
   said switching unit, on completion of said game segment participation, switching from displaying said game segment on said display device to displaying said recording of said broadcast sporting event on said display device.

4. The system of claim 3, further comprising: means for receiving statistical data pertaining to the sporting event; and means for using said statistical data to modify the visual representations of the actions of the viewer on the gaming device so that it appears as though the visual representation of the players action is occurring at the broadcast sporting event in real-time.

5. The system of claim 4, further comprising: means for receiving an indication that the viewer has completed a play on the gaming device; and means for returning the display of the broadcast sporting event on the display device upon receipt of said indication.

* * * * *